March 30, 1965
M. J. TYCIENSKI
3,175,429
WIRE STRIPPER
Filed July 20, 1961
3 Sheets-Sheet 1
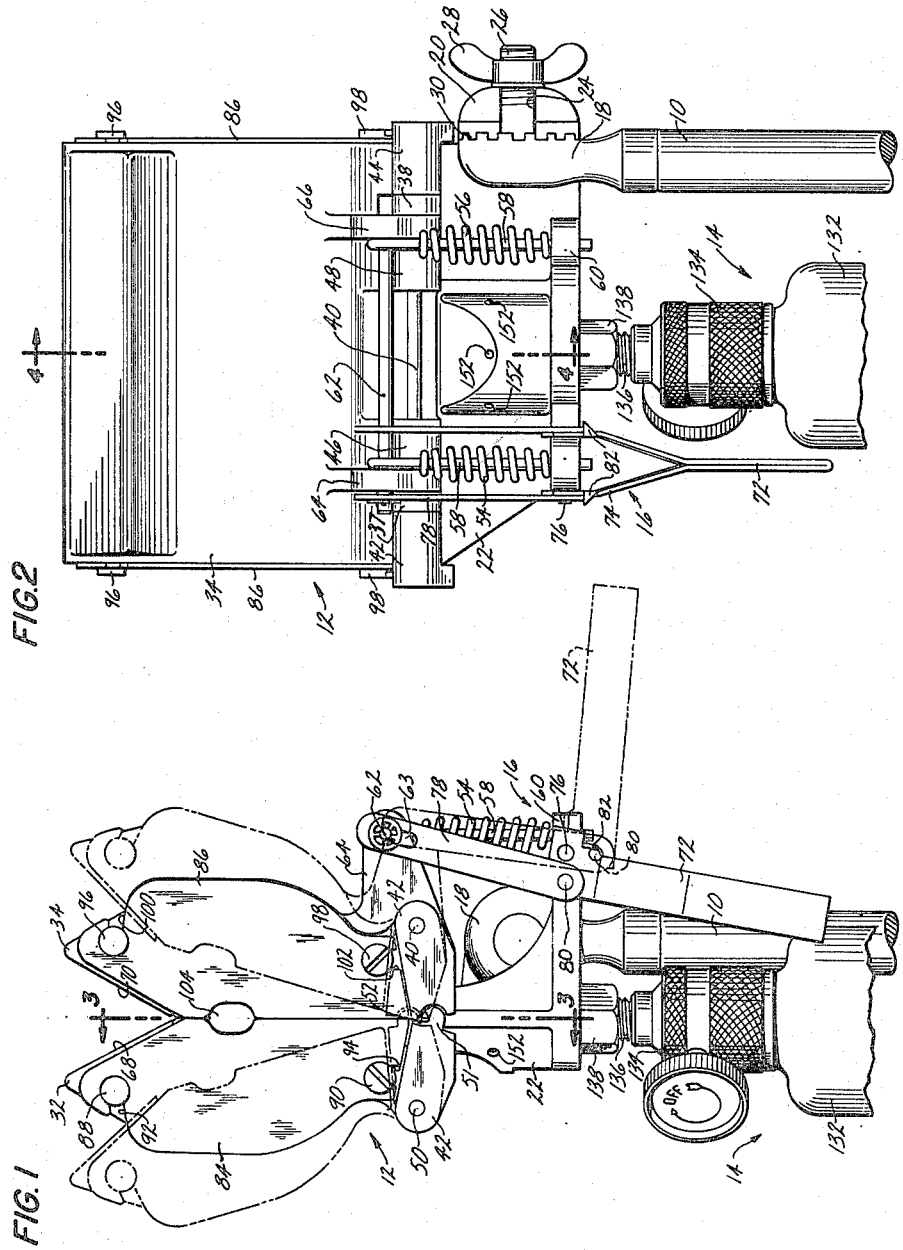
INVENTOR.
MARTIN J. TYCIENSKI
BY
ATTORNEYS March 30, 1965  M. J. TYCIENSKI  3,175,429
WIRE STRIPPER
Filed July 20, 1961  3 Sheets-Sheet 2
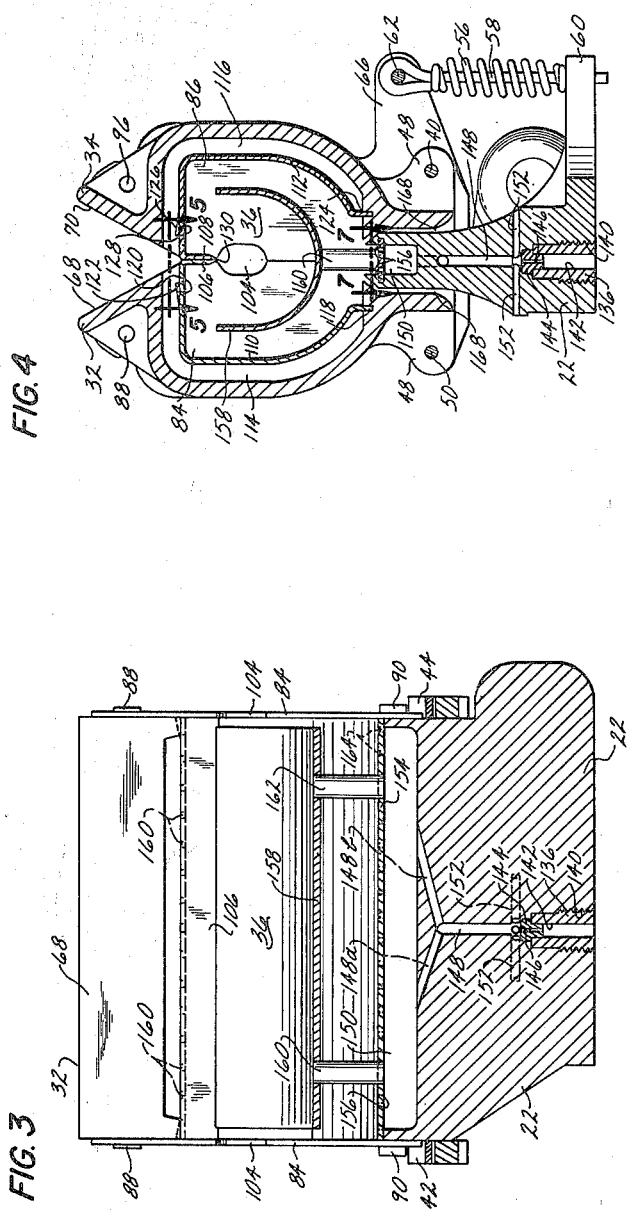
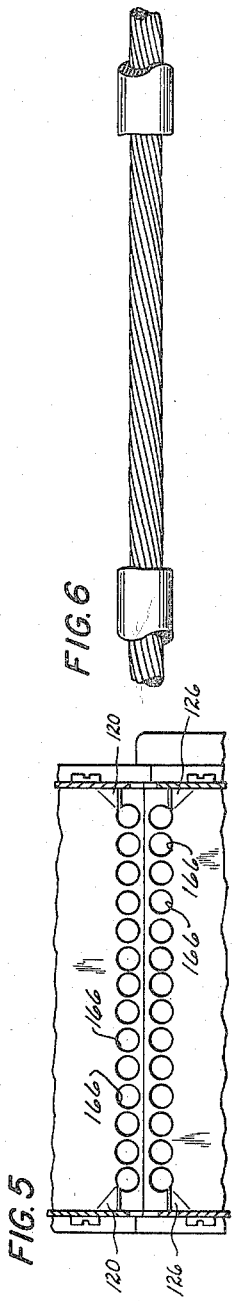

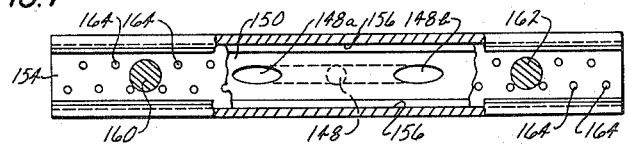
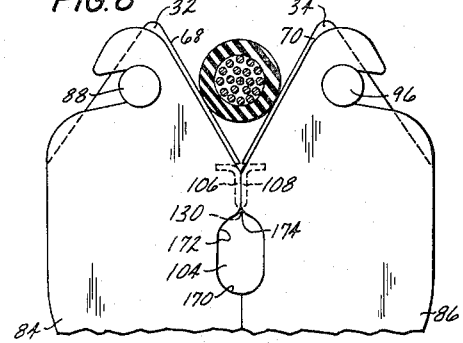
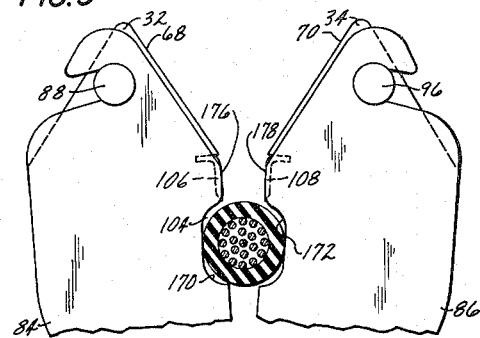
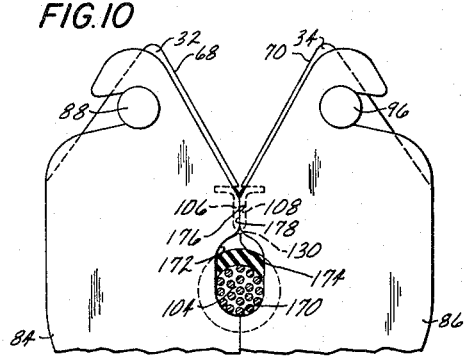
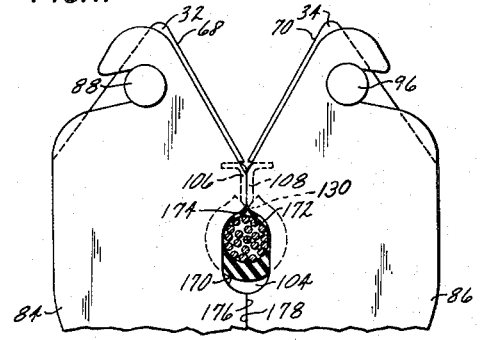
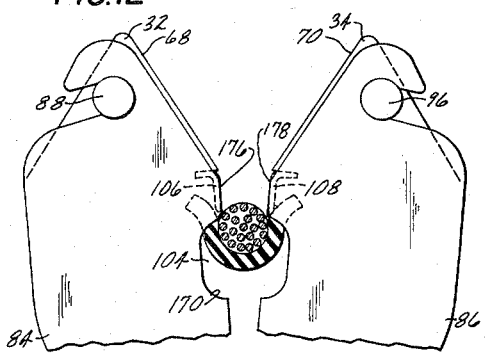
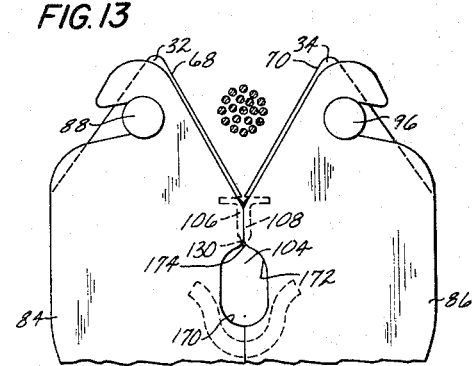

United States Patent Office 3,175,429
Patented Mar. 30, 1965

3,175,429
WIRE STRIPPER
Martin J. Tycienski, Torrington, Conn., assignor, by mesne assignments, to Tool-Tech Corporation, Winsted, Conn., a corporation of Connecticut
Filed July 20, 1961, Ser. No. 125,577
17 Claims. (Cl. 81—9.5)

This invention relates to a wire stripper and, more particularly, to a portable wire stripper adapted to remove sections of insulation from heavy-duty electrical conductors secured in place atop supporting poles or towers. The wire stripper of the invention finds particularly advantageous use in removing insulation from a comparatively new type of heavy-duty conductor with a paraffin base plastic insulating sheath which is extremely tough, effective as an insulator, and durable in use but which is quite difficult to strip from the core of the conductor. It is to be understood, however, that the invention is not limited to a wire stripper particularly adapted for use with any specific type of heavy-duty conductor.

It is the general object of the present invention to provide a wire stripper which is adapted for the rapid and efficient removal of a section of insulation from the core of a conductor through the application of heat to the section of insulation to be removed and to a plurality of cutting knives operable to sever the insulation for removal.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:
FIG. 1 is an end view of a wire stripper embodying the invention with separable housing parts and a handle shown in two positions.
FIG. 2 is a side view of the wire stripper.
FIG. 3 is a vertical longitudinal section taken generally as indicated at 3—3 in FIG. 1.
FIG. 4 is a vertical transverse section taken generally as indicated at 4—4 in FIG. 2.
FIG. 5 is a partial horizontal section taken generally as indicated at 5—5 in FIG. 4.
FIG. 6 is a view of a section of wire after stripping of a section of insulation from the core thereof.
FIG. 7 is a partial horizontal view taken generally as indicated at 7—7 in FIG. 4.
FIGS. 8 through 13 are enlarged fragmentary end views showing steps in a wire stripping operation in sequence.

Referring particularly to FIGS. 1 and 2, it will be observed that a portable wire stripper shown therein comprises an elongated handle 10 which supports a head assembly comprising a housing indicated generally at 12, a tank and valve assembly indicated generally at 14, and a small handle assembly indicated generally at 16. The handle 10 which may be of the type commonly referred to as a "hot stick" carries a connector 18 at its upper end portion which is adapted for attachment with a connecting element 20. The connecting element 20 is formed integrally with and extends laterally from a rear portion of a base 22 of the housing 12. A slot 24 in the connecting element receives a threaded stud 26 on the connector 18 and a mating wing nut 28 is provided for securing the connector and connecting element together. Mating ratchet faces indicated at 30 between the connector and the connecting element provide for attachment of the head assembly to the handle 10 in selected angular positions. As shown, the handle 10 extends vertically and the vertical center line of the head assembly is parallel thereto and this is the preferred arrangement and provides for convenient manipulation of the head assembly. That is, a lineman can grasp the handle and lift the stripper upwardly to a position beneath a section of a conductor secured in place on a supporting pole or tower. With the wire stripper so located, the stripping operation may be commenced and conveniently carried out in a manner to be described hereinbelow.

The base 22 of the housing 12 supports first and second or left and right-hand separable housing parts 32 and 34. Said housing parts are preferably swingably connected as will be seen and a heating chamber 36 is defined therewithin as best shown in FIG. 4. As will also be seen, a section of wire to be stripped can be placed within the heating chamber 36 for heating of the insulation thereon. In accordance with the invention, there is also provided at least one end knife and at least one side knife and said knives are heated and respectively operable to effect communicating end and side cuts in the heated insulation. Further, after severing by the end and side knives, the insulation on a selected section of wire is automatically stripped from the core so as to permit electrical connections to be made with the core.

Considering the separable housing parts 32 and 34 in greater detail and referring particularly to FIG. 4, it will be observed that the said parts are generally U-shaped in cross section and of substantially identical construction with open sides in facing relationship. Similar front and rear laterally projecting ears 37 and 38 at the upper right-hand portion of the base 22 journal a right-hand pivot pin 40 best shown in FIGS. 1 and 2. The said pivot pin is secured in suitable front and rear linkage or hinge members 42 and 44 and in ears 46 and 48 to provide for swinging movement of the housing part 34, the said linkage or hinge members 42, 44 and ears 46 and 48 all being formed integrally with the said housing part. At the upper left-hand portion of the base 22 a pair of ears not shown but similar to the ears 37 and 38 are provided. Additionally, the left-hand housing part 32 is provided with front and rear linkage or hinge members 42 and 44 and with ears 46 and 48 not shown but similar to those formed on the housing part 34. A left-hand pivot pin 50 journaled in the left-hand ears 37 and 38 and secured in suitable openings in the left-hand hinge members 42 and 44 and in suitable openings in the left-hand ears 46 and 48 provides for swinging movement of the left-hand housing part 32.

Now it will be apparent that the housing parts 32 and 34 can be swung from the closed full line position of FIG. 1 to an open position such as indicated by broken line in FIG. 1. To provide for swinging movement of the housing parts 32 and 34 in unison, the left-hand linkage or hinge members 42 and 44 are provided with small partially circular lugs 51, 51, one shown in FIG. 1. Said lugs are respectively loosely received in partially circular recesses 52, 52, one shown, formed respectively in the front and rear right-hand linkage or hinge members 42 and 44 to form hinge connections between the left and right-hand hinge members.

Normally, the left and right-hand housing parts 32 and 34 are biased to the closed full line position of FIG. 1 by means of first and second or front and rear compression springs 54 and 56, FIG. 2. The springs 54 and 56 each have a vertical support rod 58 associated therewith, the said rods 58, 58 being disposed within the coils of their respective springs and extending through suitable openings in a flange 60 formed on the base 22 with lower ends of the springs 54 and 56 resting atop the flange. At the upper end each of the rods 58 is bent back upon itself about a small horizontal pin 62. The upper ends of the springs 54 and 56 respectively abut the end surfaces of the bent back portions of the support rods 58, 58 and the pin 62 is confined within said bent back portions. Thus, the springs 54 and 56 can be held in compression between the flange 60 and the end surfaces of the bent back portions of their respective support rods. In such condition, the springs 54 and 56 urge the pin 62 upwardly and, as will be seen, bias the housing parts 32 and 34 to their closed positions.

As best shown in FIGS. 1 and 2, the pin 62 is entered in short laterally projecting arms 64 and 66 formed integrally on the right-hand portion of the housing part 34. Said arms tend to urge the said housing parts inwardly to the closed position when the pin 62 is urged upwardly by the springs 54 and 56 as stated. Inward swinging movement of the housing part 34 is of course accompanied by simultaneous inward swinging movement of the left-hand housing part 32 through operation of the above-described connection of the front and rear hinge members 42, 42 and 44, 44.

The housing parts 32 and 34 can be swung open in either of two ways. At upper portions thereof the said parts are provided respectively with camming surfaces 68 and 70 best shown in FIG. 1. Said surfaces are inclined downwardly and inwardly toward each other to provide a substantially V-shaped entry slot for a section of wire or conductor. That is, the stripper may be lifted to a position beneath the wire or conductor as illustrated in FIG. 8. Engagement of the section of wire with the surfaces 68 and 70 and further upward movement of the wire stripper will result in opening movement of the housing parts 32 and 34 against the bias of the springs 54 and 56 and in entry of the wire into the aforesaid heating chamber 36.

A handle 72 provides a second means for opening the housing parts 32 and 34. As best shown in FIG. 2, the handle 72 has a bifurcated upper end portion 74 pivotally secured to the housing flange 60 by means of a pin 76. A toggle link 78 has its upper end portion pivotally secured to the aforesaid pin 62 by entry of the pin in a slot 63 and the lower end portion of said link is pivotally secured to the upper end portion of the handle 72 by means of a pin 80. The pin 80 is eccentrically located in the upper end portion 74 of the handle 72 so as to provide for an overcenter location of the pin with respect to the pin 76 when the handle 72 is swung in a counterclockwise direction to the broken line position of FIG. 1. That is, the pin 80 is overcenter with respect to the pin 76 when the handle 72 is in the open position and the handle tends to continue movement in a counterclockwise direction. Two small ears 82, 82 on the handle engage the link 78 in such position to prevent such continued counterclockwise movement. Thus, the ears 82, 82 constitute a latching means or device adapted to hold the handle 72 in its broken line or open position. Obviously, counterclockwise movement of the handle toward its open position effects downward swinging movements of the link 78, the pin 62, the arms 64 and 66 and swinging movement of the separable housing parts 32 and 34 to the open position. As will be seen, manual opening of the housing parts 32 and 34 is accomplished by means of the handle 72 to permit convenient removal of a stripped section of insulation from the heating chamber 36.

As mentioned, at least one end knife and one side knife are provided in accordance with the invention. In the preferred embodiment of the invention shown, two longitudinally spaced end knives and two closely adjacent but separable side knives are provided. While the invention is not so limited, the end knives shown are adapted to cut the insulation in radial planes and the side knives shown effect a longitudinally extending or lengthwise side cut in an axial plane. The side cut effected by the side knives extends between and connects the end cuts so that the section of insulation between the end cuts is completely severed from the underlying core and free to be stripped therefrom.

Each of the end knives shown has two parts which are or may be identical in all respects and which are mounted respectively on the separable housing parts 32 and 34 so as to be movable therewith. First and second or right and left-hand parts 84 and 86 of a front end knife are shown in FIG. 1 and identical parts 84 and 86 of a rear end knife are provided respectively at rear end portions of the housing parts 32 and 34. The front left-hand knife part 84 is held at an upper portion by means of a pin 88 having an enlarged head and at a lower end portion by means of a threaded stud 90 also having an enlarged head. Preferably and as shown, suitable slots 92 and 94 are formed at upper and lower end portions of the knife part 84 so that the part can be slid into engagement with and behind the heads of the pin 88 and the stud 90. Removal of the knife part can thus be effected without removing the pin and/or the stud. A pin 96 and a stud 98 serve to hold the front right-hand knife part 86 in position and said elements cooperate with slots 100 and 102 in a manner identical with that described for the slots 92 and 94 in the knife part 84. The knife parts 84 and 86 at the rear end of the housing parts 32 and 34 are secured in place in a manner identical with that described for the front knife parts. As will be seen, a small slot 104 defined by and between the front end knife parts 84 and 86 is adapted to receive a front end portion of a wire section and an identical slot 104 defined between the rear knife parts 84 and 86 similarly receives a rear end portion of a wire section to be stripped.

Left and right-hand longitudinally extending side knives 106 and 108 are best shown in FIGS. 3 and 4. Said knives are integrally formed respectively with generally U-shaped left and right-hand liners 110 and 112 carried respectively by the left and right-hand housing parts 32 and 34 and disposed therewithin to provide insulating chambers 114 and 116, FIG. 4. A lower end portion 118 of the liner 110 is entered in a longitudinally extending slot in the left-hand housing part 32 and small ears 120, 120 at opposite ends of said liner and at an upper portion thereof are engaged with adjacent shoulders 122, 122 formed in the housing part 32 to retain the liner in place, FIG. 4. That is, the liner 110 is flexible and can be sprung into position as shown and is retained in such position by entry of its lower end portion 118 in the aforesaid slot and by engagement of its ears 120, 120 with the shoulders 122, 122. A lower end portion 124, ears 126, 126, and shoulders 128, 128 serve a similar purpose with respect to the liner 112.

As best seen in FIG. 4 and in FIGS. 8 to 13, the side knives 106 and 108 lie in closely adjacent relationship when the housing parts 32 and 34 are closed. Said knives cooperatively form a cutting edge 130 when they are in closely adjacent relationship but when the housing parts 32 and 34 are swung apart, the knives 106 and 108 swing apart therewith to perform an insulation stripping operation as will be explained.

From the foregoing, it will be apparent that the chamber 36 is substantially a closed chamber when the housing parts 32 and 34 are in closed positions. Substantially closed end walls are formed by the front and rear end knives comprising the parts 84, 84 and 86, 86 and top and side walls are formed by the liners 110 and 112. Means forming a bottom wall of the chamber and means adapted to heat the cutting knives and a section of wire disposed in the chamber 36 will now be described.

In the presently preferred form, flame heating is provided for and the heating means comprises a tank or container 132 for a combustible gas, FIGS. 1 and 2. The tank or container 132 may take the form of a conventional "Bernz-o-matic" tank for propane gas and a convention on-off "Bernz-o-matic" valve 134 may be provided atop the tank. A threaded stem 136 and a lock nut 138 may be utilized to connect the valve and tank to the base 22 of the housing 12. As best shown in FIGS. 3 and 4, the stem 136 is entered in a suitably threaded bore 140 in the base 22 and has an axial bore 142 for the passage of propane or other gas. A plug 144 entered in the bore or passageway 142 at its upper end has a small orifice 146 communicating with a main mixing passageway 148 in the base 22. The main mixing passageway 148 extends upwardly in the base 22 to branch mixing passageways 148a and 148b which in turn communicate with a mixing chamber 150. Radially extending air inlet passageways 152, 152 communicate with the main mixing passageway 148 adjacent the plug 144 and extend to the exterior surface of the housing base 22 as best shown in FIGS. 1 and 2. Thus, it will be seen that a combustible mixture can be provided in the mixing chamber 150 by opening of the valve 134.

An apertured cover plate 154 for the mixing chamber 150, best shown in FIG. 7, is slidably entered in suitable slots 156, 156 formed in the base 22 adjacent the walls of the chamber 150, as best shown in FIG. 4. The aforementioned parts of the end knives hold the cover plate against lengthwise displacement and in turn secure a baffle 158, FIG. 3, in position. The baffle 158 is supported from and above the cover plate 154 by a pair of upright posts 160 and 162. As best shown in FIG. 4, the baffle 158 is generally U-shaped in cross section and is approximately centrally located in the chamber 36. The baffle is spaced from the top of the chamber and is somewhat shorter than the chamber 36, as best shown in FIG. 3, so as to provide spaces between its ends and the aforesaid front and rear end knives comprising the knife parts 84, 84 and 86, 86.

From the foregoing, it will be apparent that a combustible mixture in the chamber 150 can be ignited to provide for flame heating of the chamber 36. As best shown in FIG. 7, apertures 164, 164 are spaced substantially throughout the length of the cover plate 154. Thus, flame will be distributed substantially throughout the length of the heating chamber 36. The baffle 158, however, limits direct contact of the flame with the insulation of a section of wire disposed in the chamber. Moreover, said baffle serves to direct the flame upwardly in spaced columns and thence toward and onto the side cutting knives 106 and 108. Additionally, the aforesaid spaces at opposite ends of the baffle 158 provide for direct flame contact and for effective heating of the end knives comprising the knife parts 84, 84 and 86, 86. As best shown in FIG. 5, exhaust ports 166, 166 for the heating chamber are formed in parallel rows respectively in upper portions of the liners 110 and 112. Longitudinally extending slots 168, 168 shown in FIG. 4 between the base 22 of the housing and the separable housing parts 32 and 34 also communicate with the heating chamber 36. Air passing upwardly through said slots provides a jet effect and enhances the effectiveness of the flame in the heating chamber.

From the foregoing, it will be apparent that a substantial degree of heating of the several cutting knives and of the insulation on a wire section can be accomplished in the heating chamber 36 to facilitate cutting of the insulation. Preferably, the baffle 158, the liners 110 and 112, the cover plate 154, and the posts 160 and 162 are formed of stainless steel or other suitable heat-resistant material. The end knives comprising the parts 84, 84 and 86, 86 are similarly formed of stainless steel while the remaining portions of the housing may be formed of cast iron. In using the wire stripper, it is the preferred practice to ignite the mixture in the chamber 150, preheat the chamber 36 for a short period of time, and then raise the stripper to an operating position beneath the wire as shown in FIG. 8.

In the fragmentary showing of FIG. 8, the camming surfaces 68 and 70 on the housing parts 32 and 34 are shown in engagement with the insulation on a section of wire in situ. In this position of the wire stripper, the heating chamber 36 is preheated and the stripper is ready for use.

Upward movement of the stripper will result in opening of the housing parts 32 and 34 as shown in FIG. 9 and the wire will be entered in the heating chamber 36 and disposed in the slots 104, 104 between the parts of the front and rear end knives 84, 84 and 86, 86 as shown. Substantially simultaneously with the entry of the wire into the heating chamber and between the parts of the end knives, the housing parts 32 and 34 will start to close at the urging of the biasing springs 54 and 56 and the end knife parts 84, 84 and 86, 86 will form at least side portions of two spaced end cuts as shown in FIG. 10. That is, the slots 104, 104 have vertical dimensions greater than the core diameter of the wire, but the horizontal dimensions are substantially equal to the diameter of the core. Thus, irrespective of the vertical position of the wire in the slots 104, 104, at least opposite side portions of each end cut are effected on closing of the housing parts 32 and 34 to the FIG. 10 position.

Still referring to FIG. 10, it will be observed that the lower portion or cutting edge 170 of the slot 104 shown is partially circular and conforms substantially with the periphery of the core of the wire. Thus, a lower portion of each end cut can also be completed during the closing operation of the housing parts 32 and 34 if the wire is disposed in lower portions of the slots 104, 104. If the wire is located substantially centrally or in upper portions of the slots 104, 104 during closing of the housing parts 32 and 34, a slight subsequent upward movement of the stripper is necessary to complete such lower portions of the end cuts.

Still referring to FIG. 10, it will be observed that an upper wall or cutting edge 172 of the slot 104 shown follows an arc on a radius slightly larger than that of the core of the wire except at a central portion 174. At the said central portion, the cutting edge 172 forms corners with vertical inner edge portions 176 and 178 of the parts 84 and 86 of the front end knife shown. As shown, these corners are rounded or blended with their respective knife edge surfaces so as to form a small inverted V. The effect of the contour of the upper cutting edge 172 and its counterpart in the rear slot 104 should be apparent. If the wire stripper is moved downwardly from the position shown in FIG. 10, the core of the wire will be brought into engagement with the cutting edges 172, 172 and upper portions of each of the end cuts will be completed. When the said portions of the end cuts have been completed and the wire core engages the cutting edge, a camming action will occur tending to open the parts 32 and 34 of the housing. It is found that little or no scratching or marring of the core occurs during such camming action and this is attributed at least in part to the provision of the aforesaid rounded corners at the central sections 174, 174 and the increased radius of the remaining portions of cutting edges 172, 172.

Referring to FIG. 11 and reverting to the instant in time when the upper portion of the end cuts commences with downward movement of the wire stripper, it will be observed that the connecting side or longitudinal cut is initiated simultaneously or shortly thereafter. That is, the side knives 106 and 108 have their cutting edge 130 disposed adjacent and extending between the upper edges 172, 172 of the slots 104, 104. As the upper portions of the end cuts are made, the longitudinal side cut is also effected and the side knives 106 and 108 engage the core, or approximately engage the core, as the camming action between the cutting edges 172, 172 and the core occurs. Thus, the said side knives slide downwardly and outwardly in engagement or approximately in engagement with the core as the housing parts 32 and 34 swing open. As illustrated in FIG. 12, this results in peeling or stripping of the insulation from the wire section between the end cuts.

In FIG. 13 the core has cleared the side knives 106 and 108 on continued downward movement of the stripper and the biasing springs 54 and 56 have once again swung the housing parts 32 and 34 to a closed position. The stripped section of insulation now rests within the heating chamber 36 and the core of the wire is bared as shown in FIG. 6. Manipulation of the aforementioned handle 72 can now be accomplished to remove the stripped section of insulation from the heating chamber whereupon the stripper will be conditioned for a succeeding wire stripping operation.

From the foregoing, it will be apparent that a portable wire stripper of desirably simple and yet durable construction has been provided. A wire stripping operation can be performed in a rapid and efficient manner merely by manipulating the handle to move the wire stripper upwardly into engagement with a section of wire in situ, further elevating the stripper to introduce the wire to the heating chamber and to complete side and lower portions of spaced end cuts, and then lowering the stripper to complete upper portions of the end cuts to effect a connecting side cut, and to strip the severed section of insulation.

Such terms as left and right-hand, elevating, lowering, upper, lower, vertical, and horizontal and the like are employed herein for convenience and clarity of description only and it is to be understood that these terms are not to be taken in any limiting sense herein or in the claims which follow.

The invention claimed is:

1. A wire stripper comprising a housing including a pair of separable housing parts having spaced apart side and end walls defining a substantially closed chamber for receiving a wire section from which the insulation is to be stripped, means mounting the housing parts for movement towards and away from each other between open and closed positions, two pair of cooperable knives in communication with the chamber, means mounting each pair of knives respectively to the opposite ends of the housing parts for movement therewith and positioning each pair of knives to effect a circumferential cut in the insulation at the ends of the wire section, said last named means comprising a plurality of pins projecting from the ends of each housing part and a plurality of slots in each knife of said pairs of knives, said slots opening into the marginal edges of the knives and removably receiving the pins, at least one additional knife fixed to one of the housing parts and having a cutting edge longitudinally extending between said pairs of cooperable knives to effect a longitudinal cut in the insulation of the wire section, and heating means supported by the housing for heating the chamber.

2. A wire stripper comprising a housing including a pair of separable housing parts having spaced apart walls defining a chamber for receiving a wire section from which the insulation is to be stripped, means mounting the housing parts for pivotal movement towards and away from each other, linkage means connecting the housing parts providing simultaneous movement of the parts, spring means biasing the housing parts to closed position, releasable latch means for holding the parts in open position in opposition to the biasing force of the spring means, first knife means mounted to the opposite ends of the housing parts for movement therewith for circumferentially cutting the insulation at the ends of the wire section when the housing parts are in closed position, second knife means fixed to the housing parts and extending between said first knife means for longitudinally cutting the insulation of the wire section, and heating means supported by the housing for heating the chamber and said first and second knife means.

3. A wire stripper comprising a housing including a pair of separable housing parts having spaced apart walls defining a chamber for receiving a wire section from which the insulation is to be stripped, means mounting the housing parts for movement toward and away from each other between open and closed positions, means biasing the housing parts together toward closed position, said housing parts having external cam surfaces engageable with the wire section for opening the housing parts to receive the wire section in the chamber, two pairs of cooperable knives in communication with the chamber, means mounting each pair of knives respectively to the ends of the housing parts for movement therewith and positioning each pair of knives to effect a circumferential cut in the insulation at the ends of the wire section, at least one additional knife fixed to one of the housing parts and having a cutting edge located in the chamber and longitudinally extending between said pairs of knives to effect a longitudinal cut in the insulation of the wire section, and heating means supported by the housing for heating the chamber to thereby heat said knives in addition to the insulation to be removed from the wire section.

4. A wire stripper comprising a housing including a pair of separable housing parts having spaced apart walls defining a chamber for receiving a section of wire from which the insulation is to be stripped, means mounting the housing parts for movement toward and away from each other between open and closed positions, means biasing the housing parts together toward closed position, said housing parts having external cam surfaces engageable with the wire section for opening the housing parts to receive the wire section in the chamber, first knife means on the ends of the housing parts for circumferentially cutting the insulation at the ends of the wire section when the housing parts are in closed position, second knife means on the housing parts extending between said first knife means for longitudinally cutting and subsequently stripping the insulation of the wire section, said first knife means including a cam means engageable with the core of the wire section for opening the housing parts to remove the wire section from the chamber and to cause said second knife means to strip the wire section as the wire section is being removed, and heating means supported by the housing for heating the chamber to thereby heat the insulation to be removed from the wire section.

5. A wire stripper for stripping the insulation from a wire section comprising a housing including a pair of separable housing parts having open and closed positions and having spaced apart side walls and end walls defining a substantially closed wire receiving chamber when the housing parts are in closed position, means biasing the housing parts to closed position, the end walls of the housing parts being formed by knives having edges engageable with each other when the housing parts are in closed position, said knife edges having registrable cutting portions defining elongated slots at the ends of the housing when the housing parts are in closed position adapted to receive the ends of the wire section for circumferentially cutting the insulation thereof, the elongated dimension of said slots being greater than the diameter of the wire section to permit relative movement between the housing parts and the wire section received in the slots, said cutting portions having cam surfaces engageable with the core of the wire section for moving the housing parts to open position upon said relative movement between the wire section and the housing parts to thereby remove the wire section from the housing, a pair of knives fixed on the housing parts respectively in side-by-side relationship and having longitudinally extending cutting edges terminating at the slots adjacent one end thereof for longitudinally cutting the wire section upon said relative movement between the wire section and the housing parts and thereafter stripping the wire section as the housing parts are moved to open position upon continued relative movement, and heating means supported by the housing for heating the chamber to thereby heat the section of wire to be stripped as well as the knives.

6. The combination defined in claim 5 wherein said housing parts have means including external cam surfaces adapted to be engageable with the wire section for opening the housing parts to receive the wire section in the chamber.

7. The combination as defined in claim 5 wherein the ends of said slots have an arcuate shape generally conforming to the curvature of the wire section to be stripped and wherein said slots have a width approximately equal to the core of the wire section to be stripped.

8. The combination of claim 5 wherein the heating means comprises a container for combustible gases supported by the housing, a main flow passage in the housing communicating with the chamber and the interior of the container, valve means for controlling gas flow into the main passage and air passage in the housing communicating with said main passage and the atmosphere.

9. The combination as defined in claim 8 wherein said housing has a plurality of spaced inlet passages located across the housing, each passage communicating with said chamber and said main passage, and wherein a baffle is mounted in the chamber and disposed between the inlet passages and the slots formed by the end knives.

10. The combination defined in claim 5 wherein the housing has a metal liner fixed in the chamber in generally coextensive relationship with the side walls of the housing and wherein said pair of knives are formed by marginal portions of the liner.

11. A wire stripper comprising a housing including a pair of separable housing parts having spaced apart walls for receiving a wire section from which the insulation is to be stripped, means mounting the housing parts for movement towards and away from each other between open and closed positions, first knife means mounted on opposite ends of the housing parts for circumferentially cutting the insulation at the ends of the wire section when the housing parts are in closed position, second knife means mounted on one of the housing parts and extending between the first knife means thereon for longitudinally cutting the insulation of said wire section and cam means associated with said first knife means engageable with the wire section to separate the housing parts thereby permitting removal of the wire section, said second knife means being engaged with said wire section during the removal thereof to strip the insulation therefrom.

12. The wire stripper as defined in claim 11 wherein the housing parts have means including inclined cam surfaces adapted to engage the wire section to be stripped for opening the housing parts to thereby receive the wire section in the chamber.

13. The wire stripper as defined in claim 11 wherein a heating means is supported on the housing for heating the insulation of the wire section to be removed as well as said knife means.

14. A wire stripper comprising a housing including a pair of separable housing parts having spaced apart walls for receiving a wire section from which the insulation is to be stripped, means mounting the housing parts for movement towards and away from each other between open and closed positions, resilient means biasing the housing parts to closed position, said housing parts having cam means including a pair of inclined surfaces engageable with the wire section for moving the housing parts to open position for receiving the wire section, first knife means mounted on opposite ends of the housing parts for movement therewith for circumferentially cutting the insulation at the ends of the wire section when the housing parts are in closed position and second knife means on the housing parts for longitudinally cutting the insulation of the wire section between the ends thereof.

15. A wire stripper comprising a housing including a pair of separable housing parts having spaced apart walls for receiving a wire section from which the insulation is to be stripped, means mounting the housing parts for movement toward and away from each other between open and closed positions, a pair of knives mounted to each end of the housing parts for movement therewith, the knives of each pair having edges engageable with each other when the parts are in closed position, said knife edges having registrable cutting portions defining elongated slots at the ends of the housing when the parts are in closed position adapted to receive the ends of the wire section for circumferentially cutting the insulation thereof, at least one additional knife fixed to one of the housing parts for movement therewith and having a longitudinally extending cutting edge terminating at the slots adjacent one end thereof, the elongated dimension of said slots being greater than the diameter of the wire section to permit relative movement between the wire section and the housing parts when the wire section is received in the slots whereby upon said relative movement said additional knife will effect a longitudinal cut in the insulation of the wire section.

16. A wire stripper comprising a housing including a pair of separable housing parts having spaced apart walls for receiving a wire section from which the insulation is to be stripped, means mounting the housing parts for movement toward and away from each other between open and closed positions, means biasing the housing parts together towards closed position, a first and second pair of knives respectively mounted to each end of the housing parts for movement therewith, the knives of each pair having edges engageable with each other when the parts are in closed position, said edges having registrable cutting portions defining elongated slots at the ends of the housing when the housing parts are in closed position adapted to receive the ends of the wire section for circumferentially cutting the insulation thereof, the elongated dimension of said slots being greater than the diameter of the wire section to permit relative movement between the housing parts and the wire section when the wire section is received in the slots, said cutting portions including cam surfaces engageable with the core of the wire section for camming the parts to open position upon said relative movement between the wire section and the housing parts, a third pair of knives fixed to the housing parts for movement therewith and having longitudinally extending cutting edges positioned in side-by-side relationship with each other and terminating at the slots adjacent one of the ends thereof whereby upon said relative movement between the housing parts and wire section said third pair of knives will longitudinally cut the wire section and thereafter upon continued relative movement effective to cam the parts to open position the third pair of knives will travel about the core of the wire section to strip the insulation thereof.

17. A wire stripper comprising a housing including a pair of separable housing parts having spaced apart walls defining a chamber for receiving a wire section from which the insulation is to be stripped, means mounting the housing parts for movement towards and away from each other between open and closed positions, spring means biasing the housing parts to closed position, first and second knife means respectively mounted on the opposite ends of the housing parts for circumferentially cutting the insulation at the ends of the wire section when the housing parts are in closed position, and a pair of knives fixed respectively to said housing parts in side-by-side parallel relationship and extending between said first and second knife means so as to effect a longitudinal cut in the insulation of the wire section and to thereafter strip the insulation from the wire section as the housing parts are separated against the bias of said spring means during removal of the wire section from the chamber.

References Cited by the Examiner

UNITED STATES PATENTS 435,414   9/90   Fisher.
785,392   3/05   Williams.

(Other references on following page)

| UNITED STATES PATENTS | | | | | FOREIGN PATENTS | | |
|---|---|---|---|---|---|---|---|
| 880,790 | 3/08 | Goehst. | | | 1,046,133 | 12/58 | Germany. |
| 1,019,835 | 3/12 | Prack. | | | 386,568 | 1/33 | Great Britain. |
| 1,022,679 | 4/12 | Huston. | | | 571,875 | 9/45 | Great Britain. |
| 1,595,793 | 8/26 | Levinger et al. | 81—9.51 | | 820,656 | 9/59 | Great Britain. |
| 1,800,317 | 4/31 | Ries et al. | | | 664,925 | 1/52 | Great Britain. |
| 2,054,529 | 9/36 | Wiggins | 81—9.51 | | 144,966 | 4/31 | Switzerland. |
| 2,054,973 | 9/36 | Ferguson. | | | | | |
| 2,432,868 | 12/47 | Earl et al. | 81—9.51 X | | WILLIAM FELDMAN, *Primary Examiner*. | | |
| 2,521,688 | 9/50 | Cataldo et al. | 81—9.51 | | MORRIS M. FRITZ, WALTER A. SCHEEL, *Examiners*. | | |
| 2,873,489 | 2/59 | Hirschorn | 81—9.51 X | | | | |